United States Patent [19]

Chiu

[11] Patent Number: 5,179,891

[45] Date of Patent: Jan. 19, 1993

[54] OIL SUPPLYING AND RECYCLING EQUIPMENT FOR A VACUUMIZED FRYING APPARATUS

[75] Inventor: Yao-Jui Chiu, Chiayi Hsien, Taiwan

[73] Assignee: Great Health, Enrich Life China Tasty Food Co., Ltd., Chiayi Hsien, Taiwan

[21] Appl. No.: 911,709

[22] Filed: Jul. 10, 1992

[51] Int. Cl.⁵ .............................................. A47J 37/12
[52] U.S. Cl. ........................................ 99/408; 99/403; 99/472; 210/167; 210/DIG. 8
[58] Field of Search ................. 99/330, 403, 404, 407, 99/408, 410, 472; 210/167, 186, DIG. 8; 426/417; 126/391, 350 R

[56] References Cited

U.S. PATENT DOCUMENTS

| | | | |
|---|---|---|---|
| 3,649,290 | 3/1972 | Angold | 99/408 |
| 3,707,907 | 1/1973 | Wilson et al. | 99/408 |
| 3,735,693 | 5/1973 | Pelster et al. | 99/403 |
| 3,968,741 | 7/1976 | Hunt | 99/330 |
| 3,977,973 | 8/1976 | Anderson | 210/167 |
| 3,984,447 | 10/1976 | Cooper et al. | 426/417 |
| 4,580,549 | 4/1986 | Sato | 126/391 |
| 4,805,525 | 2/1989 | Bivens | 99/408 |
| 4,873,920 | 10/1989 | Yang | 99/472 |
| 4,882,984 | 11/1989 | Eves, II | 99/404 |
| 4,957,758 | 9/1990 | Drijftholt et al. | 210/DIG. 8 |

FOREIGN PATENT DOCUMENTS 2468347 5/1981 France .................................. 99/408

Primary Examiner—Timothy F. Simone
Attorney, Agent, or Firm—Bacon & Thomas

[57] ABSTRACT

An oil supplying and recycling equipment particularly adapted for a vacuumized frying apparatus which is mainly equipped with a filtering tank having a U-shaped filter made of non-woven fabrics and a reservoir tank; the filtering tank is provided with a recycling duct and a connecting duct that are coupled to a main duct and to the reservoir tank respectively; and the reservoir tank is provided with a discharge duct connected to the main duct and a vacuum duct led to first and second auxiliary vacuum tanks and a vacuum pump respectively; the recycling duct and the discharge duct are provided with a control valve whereby the used frying oil in the frying pan can be filtered and recycled for further use.

1 Claim, 1 Drawing Sheet

OIL SUPPLYING AND RECYCLING EQUIPMENT FOR A VACUUMIZED FRYING APPARATUS

BACKGROUND OF THE INVENTION

The present invention relates to an oil supplying and recycling equipment mainly adapted for a vacuum operated frying apparatus, which is comprised of a filtering tank and a reservoir tank that are connected to a frying pan, a vacuum pump respectively by way of a recycling duct, a connecting duct, a main duct, a discharge duct and a vacuum duct whereby used frying oil can be recycled and filtered for further use due to the function of the vacuum pump and first and second auxiliary vacuum tanks.

Fast foods have been prevailingly accepted by people working and living in a modern society because of the fast pace of life; and most kinds of fast food are processed with frying oil, because the fried foods can be preserved longer and are edible in a short time.

In the prior frying machines, foods are directly fried in a frying pan exposed to the air so that the heated oil can be oxidized with ease and such processed oil is hard to be recycled for further use.

The present invention employs vacuumized frying pan to fry foods so as to prevent the frying oil from quick oxidization and then the used frying oil can be recycled by way of a filtering tank and a reservoir tank for further use, avoiding waste of frying oil effectively.

SUMMARY OF THE INVENTION

Therefore, the primary object of the present invention is to provide an oil supplying and recycling equipment particularly adapted for a vacuumized frying machine whereby the used oil can be recycled and filtered for further use.

Another object of the present invention is to provide an oil supplying and recycling equipment particularly for a vacuumized frying machine which can make foodstuffs fried under a vacuum state so as to reduce the speed of oxidation of the heated frying oil and the oil can be recycled and filtered many times.

DETAILED DESCRIPTION OF THE PREFERRED EMBODIMENT

Figure 1:
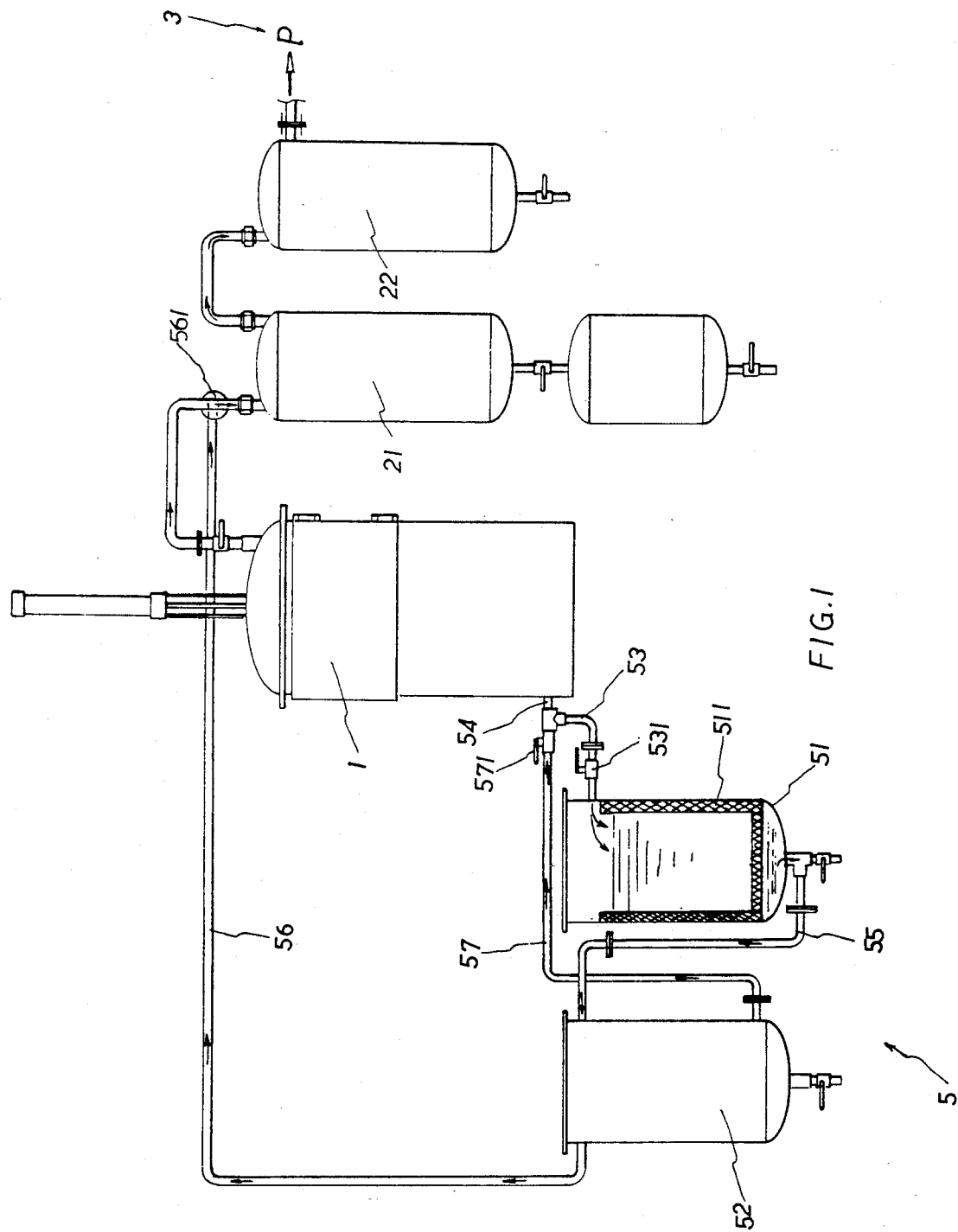
FIG. 1 is a diagram showing the connection of the present invention to a vacuumized frying pan and first and second auxiliary vacuum tanks.

Referring to FIG. 1, the present invention comprises a frying pan 1, a pair of auxiliary vacuum tanks 21, 22 and a vacuum pump 3 and an oil supplying and recycling equipment 5. The food to be fried is first located in the frying pan 1 which is vacuumized by way of the first and second auxiliary vacuum tanks 21, 22 and the vacuum pump 3; afterwards, frying oil is charged into the frying pan 1 and the food is fried therewith for a period of time; and the frying oil is discharged from the frying pan 1 and infused into a filtering tank 51 in which oil is filtered by way of a U-shaped filter 511 made of non-woven fabrics so as to effect the recycling of the frying oil.

The oil supplying and recycling equipment 5 is comprised of the filtering tank 51 and another reservoir tank 52 wherein the filtering tank 51 is equipped with a U-shaped filter 511 made of non-woven fabrics, as proceedingly described, which is disposed along the vertical wall and the bottom thereof. The hollow reservoir tank 52 is employed to receive the filtered frying oil.

The filtering tank 51 is provided with a recycling duct 53 at the top end thereof having a control valve 531 associated therewith; the recycling duct 53 is in communication with a main duct 54 and a connecting duct 55 is disposed at the bottom end of the filtering tank which is led to the top of the reservoir tank 52.

The reservoir tank 52 is provided with a discharge duct 57 at the bottom end thereof which is equipped with a control valve 571 and connects to the main duct 54 of the frying pan 1; and a vacuum duct 56 is in connection to the top of the reservoir tank 52 and further to a first auxiliary vacuum tank 21 and a second auxiliary vacuum tank 22 and finally to a vacuum pump 3.

In practical operation, as the frying pan 1 is ready for frying the food disposed therein, the vacuum pump 3 and the first and second auxiliary vacuum tanks 21, 22 are used to pump the air in the frying pan out, and in the meanwhile, the control valve 571 of the discharge duct 57 is set open and the control valve 561 of the vacuum duct 56 and the control valve 531 of the recycling duct 53 are closed. As a result of the the vacuum status in the frying pan 1, the frying oil received in the reservoir tank 52 is sucked into the frying pan 1 by way of the discharge duct 57 and the main duct 54. When the frying oil fed into the frying pan 1 comes to a certain level, the control valve 571 of the discharge duct 57 is closed, and the frying process begins in the frying pan 1.

As the frying process comes to an end, the vacuum status in the frying pan 1 is to be terminated and the control valve 531 of the recycling duct 53 is opened and the control valve 561 is opened at the same time so as to permit the vacuum duct 56 to suck the frying oil in the frying pan 1 by way of the reservoir tank 52, the connecting duct 55 and the filtering tank 51 and the recycling duct 53 and the main duct 54 whereby the frying oil will be led into the reservoir tank 52 via the reverse route indicated above. Flowing through the filtering tank 51, the frying oil is filtered by the U-shaped filter 511 made of non-woven fabrics.

The present frying apparatus is characterized in that the frying oil is heated under a vacuum status so as to protect the oil from speedy oxidization and the used frying oil can be recollected and filtered for further use whereby the frying oil can be used many times with the quality thereof maintaining at a good and safe level, resulting in the lowering of the food production costs.

I claim:

1. An oil supplying and recycling device for a vacuumized frying apparatus, comprising a frying pan, a first and second auxiliary vacuum tanks, a vacuum pump and an oil supplying and recycling equipment wherein said oil supplying and recycling equipment includes a filtering tank and a hollow reservoir tank; said filtering tank is provided with a U-shaped filter which is disposed along the vertical wall and the bottom thereof and is made of non-woven fabrics; said filtering tank is connected to a valve controlled recycling duct in connection to a main duct at the top end and to a connecting duct at the bottom end thereof; said reservoir tank is provided with a valve controlled vacuum duct in connection to said first and second vacuum tank and said vacuum pump and to said connecting duct at the top end thereof and is provided with a valve controlled discharge duct in connection to said main duct at the bottom end thereof; whereby the frying oil used in said frying pan can be recycled and filtered by use of said vacuum pump and said first and second auxiliary vacuum tanks.

* * * * *